United States Patent [19]

Cook, II

[11] Patent Number: 4,902,958
[45] Date of Patent: Feb. 20, 1990

[54] INCANDESCENT LIGHT REGULATION AND INTENSITY CONTROLLER

[75] Inventor: James C. Cook, II, Marshall, Mich.

[73] Assignee: Progressive Dynamics, Inc., Marshall, Mich.

[21] Appl. No.: 271,016

[22] Filed: Nov. 14, 1988

[51] Int. Cl.[4] .......................... H05B 37/02; G05F 1/56
[52] U.S. Cl. ...................................... 323/282; 363/21; 315/209 R; 315/291; 315/311
[58] Field of Search ............... 323/222, 273, 274, 275, 323/282–285, 289, 290; 363/21, 56, 97; 315/291, 308, 209 R, 223, 224, 311

[56] References Cited

U.S. PATENT DOCUMENTS 4,156,166  5/1979  Shapiro et al. .................. 315/291 X
4,422,138  12/1983  Kornrumpf ..................... 323/282 X

OTHER PUBLICATIONS

"USHIO Halogen Lamps Technical Specifications", pp. 16–19, Publication, Jun. 1983.
Product Literature entitled "Linear Integrated Circuits, Off-Line Current Mode PWM Controller", published by Unitrode, pp. 2–129 through 2–134, Jan. 1985.

Primary Examiner—Patrick R. Salce
Assistant Examiner—Emanuel Todd Voeltz
Attorney, Agent, or Firm—Price, Heneveld, Cooper, DeWitt & Litton

[57] ABSTRACT

A regulation and intensity controller for prolonging the life of an incandescent lamp controls the root mean square voltage across the lamp by converting AC voltage to a DC voltage and by applying the DC voltage to the lamp through a switch and an inductor in series connection with the lamp. The switch is opened and closed according to a duty cycle that will produce a constant average voltage across the lamp. The switch is closed at fixed intervals and is opened by a circuit that is responsive to the instantaneous current through the lamp and to a voltage signal produced by integrating an error signal that represents the difference between the lamp voltage and a reference voltage. In this manner, the average voltage across the lamp is regulated and ripple is kept within a level such that the average voltage is a close representation of root mean square voltage. Additionally, the cycle-by-cycle current through the lamp is closely regulated.

18 Claims, 2 Drawing Sheets

4,902,958

INCANDESCENT LIGHT REGULATION AND INTENSITY CONTROLLER

BACKGROUND OF THE INVENTION

This invention relates to a regulation and intensity controller for an incandescent lamp and in particular to such a controller for use with a high intensity incandescent lamp.

All incandescent lamps have a lifetime that is sensitive to the voltage at which the lamp is operated. This is particularly true of high intensity lamps such as the type used in operating rooms and movie projectors. For example, one such high intensity lamp is estimated to operate for approximately forty hours at 21 $volts_{RMS}$ and for only one hour at 23 $volts_{RMS}$. However, the lumen output of such a lamp is proportional to the square of the operating voltage, and therefore a decrease in voltage below the rated operating voltage may also be undesirable if a high intensity light source is desired.

The true measure of the voltage applied to a lamp, which is essentially a pure resistance device, is root mean square voltage. Accordingly, in order to assure a constant voltage applied to a lamp, it is necessary to maintain a constant $V_{RMS}$ across the lamp terminals. Controllers that monitor $V_{RMS}$ and regulate the output provided to a lamp at a rated $V_{RMS}$ level are commercially available. Such controllers are expensive and are typically used n conjunction with a step-down voltage transformer, which adds additional cost to the controller. An alternative is to apply a controlled DC voltage to the lamp because $V_{DC}$ is equal to $V_{RMS}$ and, thus, by controlling the level of the DC voltage the level of the $V_{RMS}$ is also controlled. Known DC power supplies are expensive and usually dissipate an excessive amount of power, which may, in some supplies, be equivalent to the power applied to the lamp. Importantly, the use of a constant-current DC power supply for a lamp has been observed to give rise to "filament notching" phenomena, which is the appearance of step-like or sawtooth irregularities appearing on the filament surface and which may reduce the life of the bulb to one-half, or much less, of its design-predicted value. This phenomena is believed the result of the normal decrease in filament diameter, and hence increase in impedance, which occurs during the life of a typical incandescent lamp. As the impedance increases, the voltage across the lamp, and hence the wattage applied to the lamp, will increase due to the constant-current characteristics of many DC power supplies. The increase in wattage causes an increase in the operating temperature of the lamp which tends to decrease life span.

Accordingly, it is an object of the present invention to provide an incandescent light regulation and intensity controller which provides a controlled $V_{RMS}$ voltage source for an incandescent lamp while avoiding the difficulties of the prior art controllers discussed above. More specifically, it is an object of the present invention to provide a controller which produces stable $V_{RMS}$ source for an incandescent lamp without requiring the use of expensive and bulky components, such as transformers. It is a further object to provide such a controller which causes negligible power loss through dissipation of excess power, is insensitive to a wide range to fluctuations in supply voltage, which additionally regulates lamp current, and which does not produce voltage overshoot, especially during the warm-up period of the lamp.

SUMMARY OF THE INVENTION

An incandescent lamp regulation and intensity controller according to the invention includes power conversion means, such as a rectifier network, for rectifying alternating current from a power source and for producing direct current power at a voltage that is higher than the rated voltage of the lamp; a switch and an inductor in series connection between the lamp and the rectifying network; a diode connected antiparallel across the lamp and inductor; voltage monitoring means for monitoring the voltage across the lamp and producing a signal proportional to the lamp voltage; and control means for opening and closing the switch in response to the lamp voltage signal at a duty cycle that will cause the lamp voltage to have a constant average value. In a preferred form of the invention, the signal produced by the voltage monitoring means is compared with a reference voltage to produce an error signal which is integrated by an error signal integrator. The switch is closed at fixed intervals while lamp current monitoring means monitors the current through the lamp. The lamp current signal is compared with the integrated voltage error signal and the switch is opened when the lamp current signal exceeds the integrated error signal. The control circuit thus responds to and regulates the instantaneous variations of lamp current while maintaining the average lamp voltage constant. In a most preferred form of the invention, the voltage error signal is integrated according to a closed loop time response that is larger than the period of the AC power source.

The incandescent lamp controller according to the invention provides excitation to the lamp in the form of a DC voltage having significant ripple. However, it has been discovered that, by selecting a proper size inductor in series with the lamp, the ripple is kept sufficiently small that $V_{AVE}$ applied to the lamp is within 0.1 percent of the $V_{RMS}$ applied to the lamp. Thus, by controlling $V_{AVE}$, the present controller is essentially controlling $V_{RMS}$. Because the voltage across the lamp is the primary controlled parameter, the filament notching phenomena is avoided, and because the controller is, in effect, a voltage-controlled current source, the presence of the inductor in the lamp circuit does not influence the primary feedback loop. Furthermore, it has been discovered that, by integrating the voltage error signal with a closed-loop time response that is longer than the period of the AC power source, a characteristic acoustic noise that may be emitted by the inductor is substantially eliminated without adversely affecting the life of the lamp. The cycle-by-cycle control of lamp current ensures that no undesirable over-current conditions will exist.

These and other related objects, advantages and features of this invention will become apparent upon review of the following specification in conjunction with the drawings.

DESCRIPTION OF THE PREFERRED EMBODIMENT

Figure 1:
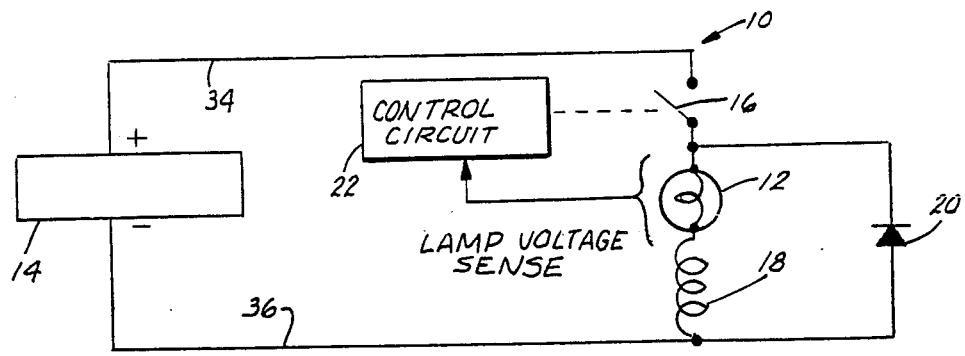
FIG. 1 is a simplified system block diagram of an incandescent lamp controller according to the invention.

Referring now specifically to the drawings, and the illustrative embodiments depicted therein, FIG. 1 illustrates an incandescent lamp regulation and intensity controller, generally shown at 10, for producing a stable $V_{RMS}$ across an incandescent lamp 12. Controller 10 includes power source means 14 for producing direct current at a voltage that is higher than the rated voltage of lamp 12, a switch 16 series-connected between power source means 14 and lamp 12, and an inductor 18 series-connected with switch 16, lamp 12 and power source means 14. A diode 20 is connected antiparallel across lamp 12 and inductor 18. A stable control circuit 22 monitors the instantaneous voltage across lamp 12 and actuates switch 16 according to a duty cycle that will cause the voltage across lamp 12 to have a constant average value.

Figure 2:
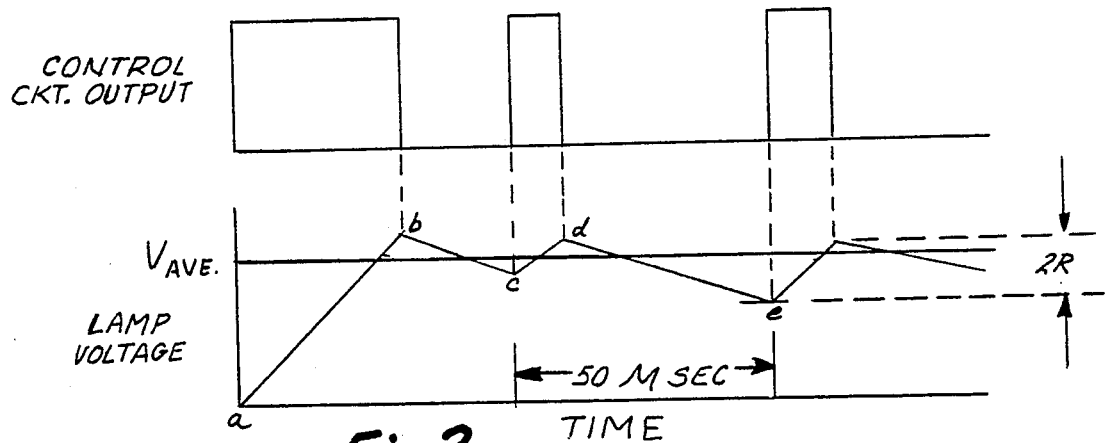
FIG. 2 is a graphic diagram of the voltages produced by the controller in FIG. 1.

The operation of controller 10 may be understood by reference to FIGS. 1 and 2. When switch 16 is closed at point a in FIG. 2, current is forced by power source means 14 through lamp 12 and inductor 18. Because the current is not capable of instantaneously changing through inductor 18, all of the voltage from the power source means initially appears across the inductor 18 and no current flows through lamp 12. Current gradually increases through the inductor and the lamp, causing the voltage across lamp 12 to increase. No current flows through diode 20 during this portion of the cycle because it is reverse-biased When the lamp voltage increases to point b in FIG. 2, control circuit 22 causes switch 16 to open, which isolates the power source means 14 from lamp 12 and inductor 18. The energy stored in inductor 18 will cause a current to flow through diode 20 and lamp 12, causing the voltage across lamp 12 to only gradually decrease to point c. At point c, circuit 22 again closes switch 16. Because the lamp voltage is already at a positive value at point c and current is flowing through the lamp, the closing of switch 16 will cause the current through, and voltage across, lamp 12 to increase to point d, at which point switch 16 will again open causing the voltage across lamp 12 to decrease to point e while inductor 18 causes current to flow through lamp 12 through diode 20. In the preferred embodiment, the time period between points a, c and e in FIG. 2, which is the period between the closing of switch 16, is a constant 50 microsecond and the duration of the closing of switch 16 is controlled by circuit 22 according to the current flowing through lamp 12 and the voltage across lamp 12 in a manner that will maintain a stable $V_{AVE}$ across lamp 12. The upper portion of FIG. 2 illustrates the portion of time that switch 16 is closed by control circuit 22.

With inductor 18 having a value greater than 400 microhenries and switch 16 closed every 50 microseconds (which corresponds to a 20 kHz repetition rate) the ripple voltage across lamp 12 does not exceed 20 percent. Using the formula $$V_{RMS} = V_{AVE} \sqrt{1 + R^2/3}$$

it can be seen that, with R=0.17, which represents a 17 percent ripple, $V_{RMS}$ does not vary from $V_{AVE}$ by more than 0.5 percent. With a careful selection of the value of inductor 18, the ripple may be readily reduced to less than 7 percent, which in turn reduces the variance between $V_{RMS}$ and $V_{AVE}$ to less than 0.1 percent. It is thus seen that the controller in FIG. 1 is capable of providing stable $V_{RMS}$ voltage to lamp 12 by controlling $V_{AVE}$.

Figure 3:
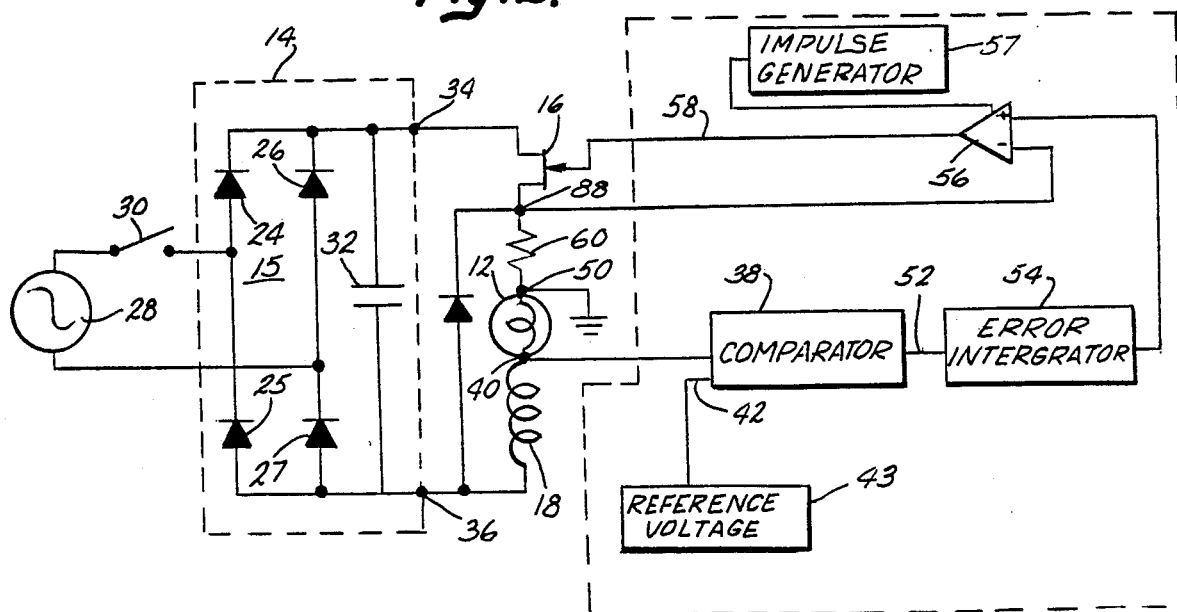
FIG. 3 is a more detailed block diagram of the controller in FIG. 1.

Referring now to FIG. 3, power source means 14 includes a power conversion means 15 such as diodes 24, 25, 26 and 27 configured as a full-wave rectifier, and a power capacitor 32, connected in parallel across output lines 34 and 36 of the full-wave rectifier. Power conversion means 15 is connected to an external AC power source 28 through a power switch 30. AC power source 28 in the illustrated embodiment is a conventional 50/60 Hz house power source, which may in actual practice vary from between 108 and 132 volts, and does not form any part of the present invention. Power conversion means 15 connected to power source 28 produces a rippled DC voltage in output lines 34 and 36 at a voltage much greater than the rated voltage of lamp 12.

As further illustrated in FIG. 3, control circuit 22 includes a comparator 38 having a first input connected to a lamp terminal 40 at the junction between lamp 12 and inductor 18. Comparator 38 additionally includes a reference input 42 which is connected to a DC reference voltage source 43. Because lamp terminal 50 is connected to the same signal ground as control circuit 22, the input to comparator 38 from terminal 40 is a negative voltage that is proportional to the voltage across lamp 12. Comparator 38 produces an output signal on line 52 that is proportional to the difference between the voltage on terminal 40 and that on reference input 42.

The error signal provided at output 52 of comparator 38 is provided as an input to an error signal integrator 54, which integrates the error signal. The output of integrator 54 is provided to pulse width controller 56 which produces a train of pulses at a constant repetition rate, determined by an impulse generator 57, but having variable widths that are determined by the inputs to controller 56. The pulses from controller 56 are provided on output line 58 to the gate of switch 16 which, in the illustrated embodiment, is a field-effect transistor. Therefore, the pulses produced by controller 56 repetitively turn on and off switch 16 to cause current to flow between power source means 14 and lamp 12 when pulses are present on line 58.

Pulse width controller 56 is illustrated in simplified form as a comparator having its noninverting input connected to error integrator 54 and its inverting input connected to junction 88 between a resistor 60 which is provided in series with lamp 12 and switch 16. Resistor 60 is of low resistance value, such as 0.1 ohms. The connection of its inverting input to junction 88 causes pulse width controller 56 to be responsive to the current flow through lamp 12, e.g. by detecting the voltage across resistor 60, which is proportional to the lamp current. Assuming for the purpose of discussion that the output from error integrator 54, and thus the noninverting input to controller 56, is at a constant DC level, output 58 of controller 56 will switch high and close switch 16 upon the occurrence of each impulse from generator 57 provided the voltage on terminal 88 is less than the noninverting input to the controller. With switch 16 thus closed, the current through lamp 12 and resistor 60 will increase until the voltage on terminal 88 reaches the level of the noninverting input to controller 56 at which time output 58 will switch low causing switch 16 to open and current through resistor 60 to decrease. This decrease in current will usually reduce the voltage on terminal 88 sufficiently so that upon the occurrence of the next impulse from generator 57, output 58 of controller 56 will switch to a high state. Thus, controller 56 regulates the instantaneous current through lamp 12 around a level that is established by the output of error integrator 54.

When the voltage across lamp 12 increases, the input from terminal 40 to comparator 38 becomes increasingly negative because point 50 is connected to the signal ground for control circuit 22. Comparator 38 subtracts the voltage on terminal 40 from the reference voltage 43 and produces an output that is proportional to this difference and inverted. If the instantaneous voltage across lamp 12 increases above a preset value established by reference voltage 43, a negative error signal will be produced on line 52 from comparator 38 that is proportional to the deviation of the lamp voltage.

Integrator 54 acts to integrate the inverted error signal provided on line 52 and provides a continuous, but varying, output to pulse width controller 56. As the output from integrator 54 decreases in response to a negative error signal, pulse width controller 56 modulates the pulses produced on line 58 to a narrower width, causing the duty cycle during which switch 16 is closed to decrease. Because the voltage across lamp 12 is directly proportional to the duty cycle of switch 16, the narrower pulses produced by pulse width controller 56 will lower the average lamp voltage.

When the instantaneous voltage across lamp 12 decreases below the preset value, terminal 40 becomes less negative, causing a positive error signal to be produced on output line 52 that is proportional to the deviation of the lamp voltage. The output of integrator 54 will become more positive as the error signal adds to the integrated error signal. Pulse width controller 56 responds by modulating the pulses on line 58 to a greater width, causing switch 16 to be closed at a greater duty cycle which causes the instantaneous lamp voltage to rise.

Figure 4:
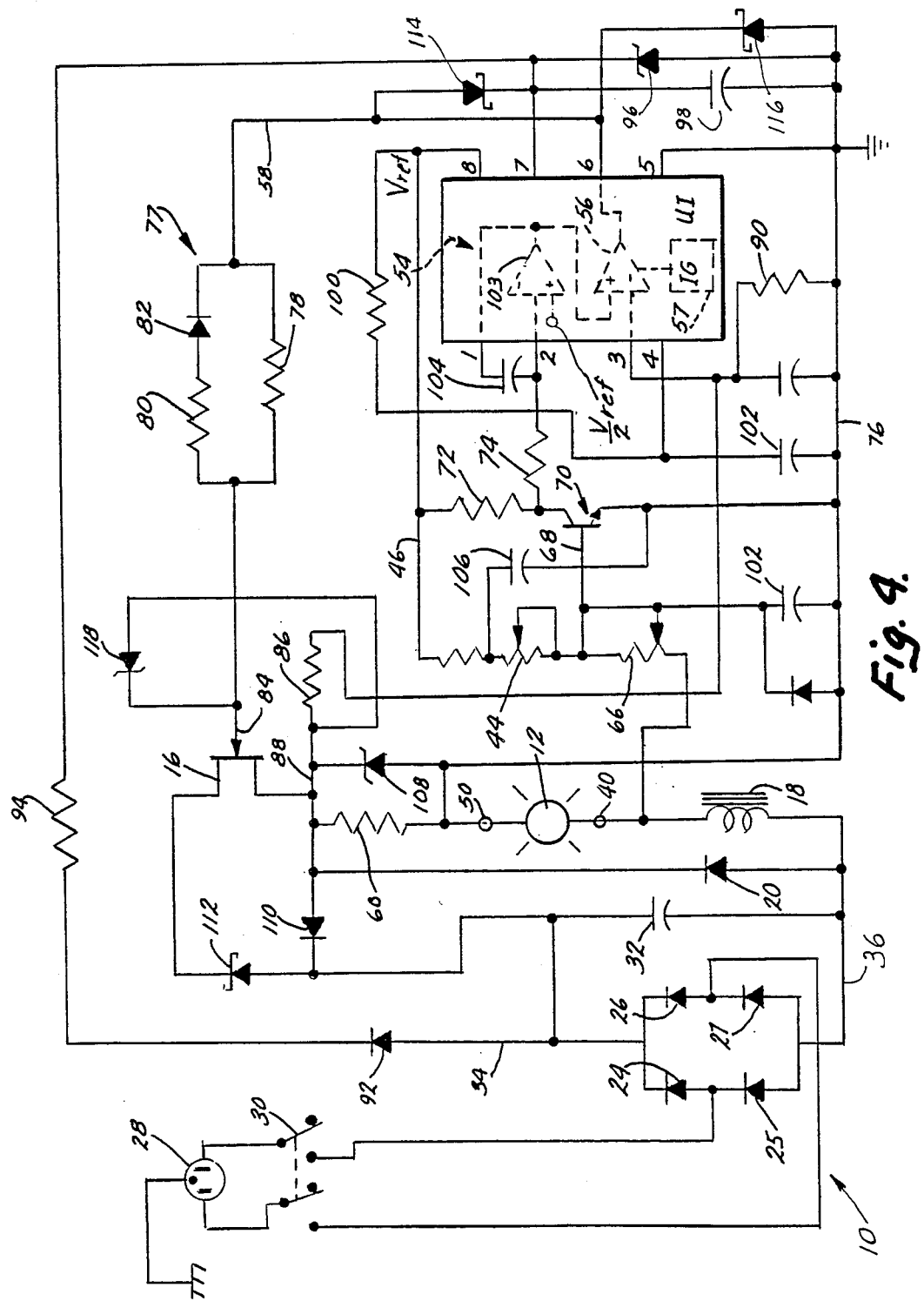
FIG. 4 is a detailed schematic diagram of the controller of FIGS. 1 and 3.

Attention is now directed to FIG. 4 where a detailed schematic of the embodiment in FIG. 3 is illustrated, like numbers for like components being used wherever possible. A line 64 extending from lamp terminal 40 is connected in series with an adjustable resistor 66 to the base 68 of transistor 70. Base 68 is also connected through potentiometer 44 to a reference voltage source line 46, which is connected to pin 8 of an integrated circuit U1. Circuit U1 is a current-mode pulse-width-modulation controller that responds to an input on its pins 2 and 3 by modulating the pulse width of a train of pulses on its output line, which is pin 6. U1 is a commercially available linear integrated circuit and is marketed under Part Nos. UC1842, UC2842 and UC3842 by Unitrode Corporation in Lexington, Massachusetts. Pin 8 of circuit U1 is a stable voltage source and provides a constant voltage for reference voltage source 46.

The collecter of transistor 70 is connected to reference voltage source 46 through a bias resistor 72 and to input 2 of circuit U1 through a resistor 74. In this manner, transistor 70 operates as an inverting comparator. As the voltage on terminal 40 becomes more negative with respect to the signal ground line 76, to which terminal 50 is connected, the voltage on base 68 of transistor 70 decreases, causing transistor 70 to conduct less collector/emitter current. Because the collector of transistor 70 is connected through resistor 72 to voltage source 46, the reduction in current conducted by transistor 70 causes the voltage on input pin 2 to circuit U1 to increase. Similarly, as the voltage on terminal 40 becomes less negative, the voltage on the base 68 of transistor 70 increases, causing the voltage provided at input on pin 2 of circuit U1 to decrease. Therefore, as the voltage across lamp 12 increases, the voltage on pin 2 increases and as the voltage across lamp 12 decreases, the voltage at pin 2 of circuit U1 also decreases.

The output of circuit U1 is provided on pin 6 and is connected to output line 58. Output line 58 is connected in series with a network 77, consisting of resistor 78 connected in parallel with a series combination of a resistor 80 and a diode 82. Network 77 is, in turn, connected to the gate 84 of FET switch 16. Positive-going pulses on line 58 are conducted to gate 84 only through resistor 78 because diode 82 will be reverse-biased. As line 58 goes from a high state to a low state on the trailing edge of pulses, diode 82 will become forward-biased, placing resistor 80 in parallel with resistor 78 to cause the gate current to turn off more rapidly than it turns on. In this manner, the turn-on/turn-off characteristics of the switch 16 may be controlled. Network 77 may, alternatively, be replaced by an individual resistor.

A resistor 86 is connected at one terminal to junction 88 between current-sensing resistor 60 and the drain of FET switch 16. The opposite terminal of resistor 86 is connected to input pin 3 of circuit U1 and, through a resistor 90, to signal ground 76. Resistors 86 and 90 thus provide a voltage divider for he current signal developed across resistor 60. In the illustrated embodiment, resistors 86 and 90 are selected such that, with a 10-amp current through sensing resistor 60 and hence lamp 12, the voltage on pin 3 of U1 will be 0.9 volts.

Power is provided to circuit U1 on pin 7, which is connected to output line 34 of power conversion means 15 through a series combination of a diode 92 and a dropping resistor 94. A zener diode 96 is connected between pin 7 and signal ground 76 to regulate the voltage on pin 7. A capacitor 98 is also connected between pin 7 and signal ground and serves to store electrical energy for use during the portion of time that switch 16 is conducting because, when switch 16 is conducting, the potential between line 34 and signal ground are about equal, which may otherwise cause circuit U1 to shut down. Pin 4 of circuit U1 is connected to the junction of a series combination of a resistor 100 and capacitor 102, which are connected between reference voltage pin 8 and signal ground 76. The purpose of resistor 100 and capacitor 102 is to determine the frequency of impulse generator 57 internal to circuit U1 which, in the illustrated embodiment, is 20 kHz.

The internal configuration of integrated circuit U1 (shown schematically in dash lines) includes the equivalent of an operational amplifier 103 having a noninverting input connected to a reference voltage internal to circuit U1, an inverting input connected to input pin 2 and an output connected to pin 1 of circuit U1. A capacitor 104 is connected between pins 1 and 2 of circuit U1 and accordingly is connected in the feedback loop between the output and input of amplifier 103. Capacitor 104 thus causes amplifier 103 to perform the function of an integrator 54. The values of capacitor 104 and resistor 74 are chosen such that the closed loop response time is relatively slow compared to the cycle period of the power source, which is typically a 60 Hz source, for reasons that will be explained in more detail below.

In operation, circuit U1 will produce a train of positive-going pulses on line 58 at a predetermined repetition rate. When an impulse is fed from impulse generator 57 to controller 56, a pulse is produced on line 58 and switch 16 becomes conducting, which causes current to flow from lines 34 and 36 through lamp 12 and inductor 18. This current causes a proportional voltage on terminal 88 which is scaled by the voltage divider formed by resistors 86 and 90 and provided to pin 3 of U1. When the increasing voltage on pin 3 of U1 reaches the value of the output of integrator 54, the pulse on line 58 is terminated. This causes switch 16 to open. However, the energy stored in inductor 18 will continue the current flow through lamp 12 via diode 20 but at a decreasing value. When the next impulse is produced by generator 57 fifty (50) microseconds later, another pulse will be produced on line 58 which will again cause switch 16 to close and the cycle to repeat. Thus, it is seen that a stable, current-responsive control loop is provided to maintain the current through lamp 12 within a stable range.

The current through lamp 12 causes a voltage across the lamp which is a negative voltage on line 64 with respect to signal ground. When the negative voltage on line 64 becomes more negative in response to an increase in the voltage across lamp 12, transistor 70 becomes less conducting, which increases the error signal current inputted to circuit U1 on pin 2. Circuit U1 responds to the positive current fed to pin 2 by integrating and inverting the error signal according to a closed loop time response that is relatively long due to the large value of capacitor 104. The resulting decrease in the output of integrator 54 causes the voltage provided to the noninverting input of controller 56 to decrease, which causes the pulses that are produced on line 58 to decrease in width because the lamp current signal provided to pin 3 of U1 will reach the value of the output of integrator 54 sooner.

When the voltage across lamp 12 decreases, the voltage on line 64 becomes less negative causing transistor 70 to become more conductive and the error signal current fed to pin 2 of U1 to become negative. The negative current to pin 2 causes the integrated and inverted output of integrator 54 to increase. The effect of the negative error signal is to increase the width of the pulses produced on output line 58, such that switch 16 will have a larger duty cycle. In this manner, controller 10 responds to the voltage across lamp 12 to maintain $V_{AVE}$ at a constant level according to a relatively long closed loop time response that is determined by the value of capacitor 104.

In this manner, the controller 10 regulates the voltage across lamp terminals 40 and 50 such that the average voltage is maintained at a constant level over a relatively long period. In the preferred embodiment, capacitor 104 is selected such that the closed loop time response is substantially greater than the cycle period of the AC power obtained through source 28. In this manner, controller 10 does not instantaneously respond to the ripple between lines 34 and 36 to smooth that ripple out. While the controller could be configured so as to be capable of essentially eliminating such ripple, it has been discovered that such rapid response may cause acoustic noise to be emitted by inductor 18 depending upon the type of inductor selected. By integrating the voltage across lamp 12 according to a relatively long closed loop time response, such as 10 milliseconds and preferably on the order of magnitude of one (1) second, the average voltage across lamp 12 is maintained stable for the purpose of enhancing the life of lamp 12, but undesirable acoustic noise in inductor 18 is avoided.

Additional components are illustrated in FIG. 4 to provide protection to sensitive circuit components and to assure proper circuit operation during transient conditions, such as are experienced during circuit start-up when switch 30 is initially closed. A capacitor 106 is provided between potentiometer 44 and signal ground in order to decrease the value of the reference voltage during start-up. This provides a gradual increase in the reference voltage, and hence the voltage across lamp 12, to prevent an overshoot in the voltage of the lamp as a result of the increase in resistance of the lamp as it warms up and stabilizes in temperature. A zener diode 108 is provided between junction 88 and signal ground 76 to insure that the gate-source voltage at FET 16 is voltage limited. Diodes 110 and 112 prevent any reverse current from entering FET 16, and provide an alternate path, thereby avoiding storage effects in the internal NPN junction of the FET. These may not be required in all embodiments. Diodes 114 and 116 protect the terminals of U1 from transient voltage spikes.

Changes and modifications in the specifically described embodiments can be carried out without departing from the principles of the invention. For example, although the invention has been illustrated using a pulse width controller providing pulses at a constant repetition rate, the pulses could, alternatively, be initiated upon the voltage of the lamp decreasing to a predetermined level. Additionally, an operational amplifier could be provided as a substitute for transistor 70 in order to perform the inverting comparator function. The operational amplifier is less sensitive to temperature-induced fluctuations than a transistor 70 and thus provides technically superior performance. However, the characteristics of transistor 70 provide satisfactory results for the application and reduce the cost of the controller. The protection afforded the invention is intended to be limited only by the scope of the appended claims, as interpreted according to the principles of patent law including the doctrine of equivalents.

The embodiments of the invention in which an exclusive property or privilege is claimed are defined as follows.

1. A method of supplying electrical power from an alternating current power source to a lamp in a manner regulating the root mean square voltage across the lamp, comprising the steps of:

rectifying power from the power source to produce cyclically varying direct current power at a first voltage;

supplying said cyclically varying direct current power to a circuit branch including said lamp in electrical series connection with an inductor;

monitoring the voltage across the lamp, comparing said voltage with a reference to produce an error signal and integrating said error signal; and controlling the amount of said direct current applied to said lamp according to the value of said integrated error signal.

2. The method in claim 1 wherein said error signal is integrated at a closed loop time response that is greater than the cycle period of the power source.

3. The method in claim 1 wherein said step of controlling includes providing a switch in said branch in electrical series connection with said lamp and said inductor and wherein said step of controlling includes repetitively opening and closing said switch.

4. The method in claim 3 further including monitoring the current through said lamp, and wherein said step of controlling includes repetitively closing said switch and opening said switch in response to the value of said current increasing to a particular value.

5. The method in claim 3 wherein said step of supplying further includes providing a diode in electrical antiparallel connection with said lamp and said inductor.

6. The method in claim 4 wherein said step of monitoring the current through said lamp includes providing a resistor in electrical series connection with said lamp, and monitoring the voltage across said resistor to provide a lamp current signal and said step of controlling includes closing said switch at fixed intervals and opening said switch when said lamp current signal increases to a particular value.

7. The method in claim 6 wherein said step of controlling further includes establishing said particular value of said lamp current signal according to the value of said integrated error signal.

8. The method in claim 7 wherein said closed loop time response is substantially greater than the cycle period of the power source.

9. A regulating circuit for supplying electrical power from an alternating current power source to an incandescent lamp comprising:
  a pair of outlet terminals configured for connection to opposite terminals of a lamp;
  power source means for producing direct current power at a voltage between two output lines that is higher than the rated voltage of the lamp;
  a switch between one of said output lines and one of said terminals;
  an inductor between the other one of said output lines and the other one of said terminals;
  a diode connected between said one of said terminals and said other one of said output lines and antiparallel said power source means;
  voltage monitoring means for monitoring the voltage across said terminals and producing a lamp voltage control signal proportional to said voltage across said terminals;
  control means for opening and closing said switch in response to said lamp voltage control signal at a duty cycle which causes the voltage across said terminals to have a predetermined average value, said control means including a reference voltage source and comparison means for comparing said lamp voltage control signal with said reference voltage and for producing an error signal proportional to the difference between said reference voltage and said lamp voltage control signal, said control means further including integrating means for integrating said error signal according to a predetermined closed loop time response.

10. The regulating circuit of claim 9 in which said power source means is configured to operate from an alternating current of between 50 and 60 Hz and said closed loop time response is greater than 10 ms.

11. A regulating circuit in claim 10 in which said closed loop time response is approximately one second.

12. The regulating circuit in claim 9 further including lamp current sensing means for sensing the current through a lamp connected between said terminals and for producing a lamp current signal proportional to said current through a lamp, and wherein said control means includes current regulating means responsive to said lamp current signal for regulating the value of said lamp current within a particular range.

13. The regulating circuit in claim 12 in which said current regulating means includes means for closing said switch at predetermined intervals and means for opening said switch when said lamp current signal increases to a value equal to the output of said integrating means.

14. A regulating circuit for supplying electrical power from an alternating current power source to an incandescent lamp comprising:
  a pair of output terminals configured for connection to opposite terminals on a lamp;
  rectifier means for rectifying alternating current from a power source;
  voltage sensing means for producing a lamp voltage signal proportional to the value of the voltage across said output terminals;
  current sensing means for producing a lamp current signal proportional to the current through said terminals;
  voltage regulating means responsive to said lamp voltage signal for regulating the voltage across said terminals such that said voltage has a substantially constant average value, said voltage regulating means including comparison means for comparing said voltage signal with a reference to produce an error signal and integrating means for integrating said error signal according to a predetermined closed loop response time; and
  current regulating means responsive to said lamp current signal for regulating the value of said current within a particular range.

15. The regulating circuit in claim 14, in which said response time is greater than the cycle period of said alternating current power source.

16. The regulating circuit in claim 14 in which said current regulating means includes switch means between said rectifier means and said output terminals for intermittently conducting current between said rectifier means and said output terminals for a cycle-by-cycle duration that will cause the value of said current to be within said particular range and at a duty cycle that will cause said voltage between said output terminals to have said substantially constant average value.

17. The regulating circuit in claim 16 in which said current regulating means includes means for periodically causing said switch means to conduct current and means responsive to said error signal integrating means and said lamp current signal for causing said switch means to terminate conducting current.

18. The regulating circuit in claim 16 further including an inductor connected in series between one of said output terminals and said rectifier means and a diode connected antiparallel between the other one of said output terminals and said rectifier means.

* * * * *